United States Patent Office 3,694,268
Patented Sept. 26, 1972

3,694,268
MULTICELL BATTERY CONSTRUCTION USING CONTINUOUS CARRIER STRIP OF SEPARATOR MATERIAL
Bernard C. Bergum, Monona, Wis., assignor to ESB Incorporated
Filed Dec. 21, 1970, Ser. No. 99,981
Int. Cl. H01m 1/00, 23/08
U.S. Cl. 136—175
6 Claims

ABSTRACT OF THE DISCLOSURE

A continuous strip of separator material is used as a carrier of positive and negative electrodes in the construction of multicell batteries. The positive and negative electrodes are first placed on opposite sides of the continuous carrier strip, and subsequently segments of the carrier strip are assembled into batteries, each segment having opposed positive and negative electrodes on the opposite sides thereof. Preferably the assembly of the segment into batteries occurs while the segments are structurally connected together as undivided parts of the continuous carrier strip, but alternatively the carrier strip may be cut into structurally unconnected segments before the segments are assembled into batteries.

BACKGROUND OF THE INVENTION

The ability to manufacture multicell batteries at low cost depends upon the ability to handle materials at high speeds and with a minimum of steps. High speed production is facilitated and the number of production steps required may sometimes be reduced with the use of continuous strips of materials rather than discrete pieces.

Illustrative of techniques which have been developed for the production of multicell batteries is the process described in U.S. Pat. #2,987,569. That process, which is used to produce a multicell battery comprising a plurality of thin, wafer-type LeClanche cells, begins by applying an electrolyte gel on one side of a continuous strip of separator material and subsequently securing a strip of zinc to the gelled side of the separator. Circular, wafer-shaped blanks are then sheared from the combination separator and zinc strip and shaped into shallow cups which later hold the positive electrodes or depolarizer mix cakes. The mix cakes are produced by compressing quantities of depolarizer mix under substantial pressure, e.g., 1000 p.s.i., with the deposits and subsequent compressions of the depolarizer mix preferably being made in the shallow cups of zinc and separator material. The resultant discrete cells are then stacked one above another to produce multicell batteries.

Several characteristics of the aforementioned process are worthy of note. The process requires that the zinc, which later functions as the anode or negative electrode in the assembled battery, be initially in the form of a strip or sheet of metal; this precludes dividing the zinc into tiny, discrete particles, even though it is well recognized in the battery art that the rate at which a battery can be discharged can be increased by dividing one large piece of electrode active material into many small ones (provided proper conditions of electrolyte diffusion and electrical conduction exist within the electrode).

The process may utilize depolarizer mix compositions which are sufficiently damp to be somewhat plastic but capable of being shaped into suitable contours. Alternatively the depolarizer mix may be substantially dry and in a state where the desired final shape can only be obtained with substantial pressure compaction, e.g., 1000 p.s.i. Both of these alternatives exclude positive electrode formulations which are in the consistency of a liquid or slurry. The limitation on the formulation of the positive electrodes in turn imposes a limitation on the minimum thickness obtainable in those electrodes, for compositions which are substantially dry or at best in a plastic state in general cannot be deposited to the same small thickness that can be obtained with more liquid compositions. Despite the fact that U.S. Pat. #2,987,569 proclaims a process capable of making wafer-type cells of a new and lower order of magnitude in thickness, e.g., 1/40 inch, such a thickness approaches the minimum obtainable with the electrode compositions required by that process.

While U.S. Pat. #2,987,569 recognizes that the continuous nature of the separator material and zinc lend themselves to inexpensive, mass production operations, it nevertheless fails to develop that principle to the fullest. The composite separator-gel-zinc is stamped into individual, discrete blanks which are subsequently formed into cups, but from the time of stamping the blanks or cups are processed as discrete, individual pieces rather than as continuous strips or sheets.

SUMMARY OF THE INVENTION

A principal feature of the invention is the use of a continuous strip of separator material along the opposite sides of which deposits of positive and negative electrodes are applied so that the separator functions as a carrier or processing implement for the electrodes of both polarities. Segments of the separator material with the electrodes deposited thereon are subsequently assembled into multicell batteries, preferably while those segments are still structurally connected together as undivided parts of the original continuous separator strip; with this preferred assembly process, the cost benefits of processing continuous strip rather than individual, dicrete pieces during battery assembly may be realized to a maximum extent. Alternatively, the segments with their electrodes deposited thereon may be cut into structurally unconnected segments before being assembled into multicell batteries.

Another feature of the invention is the use of both positive and negative electrode compositions which result in electrodes of extreme thinness and high discharge rates. Both the positive and negative electrodes may be of liquid or slurry consistencies which are painted, brushed, or printed onto the separator. As alternatives the negative electrode material may be applied in thin deposits of discrete particles by methods such as flame spraying or vacuum deposition.

DESCRIPTION OF THE PREFERRED EMBODIMENTS

Figure 1:
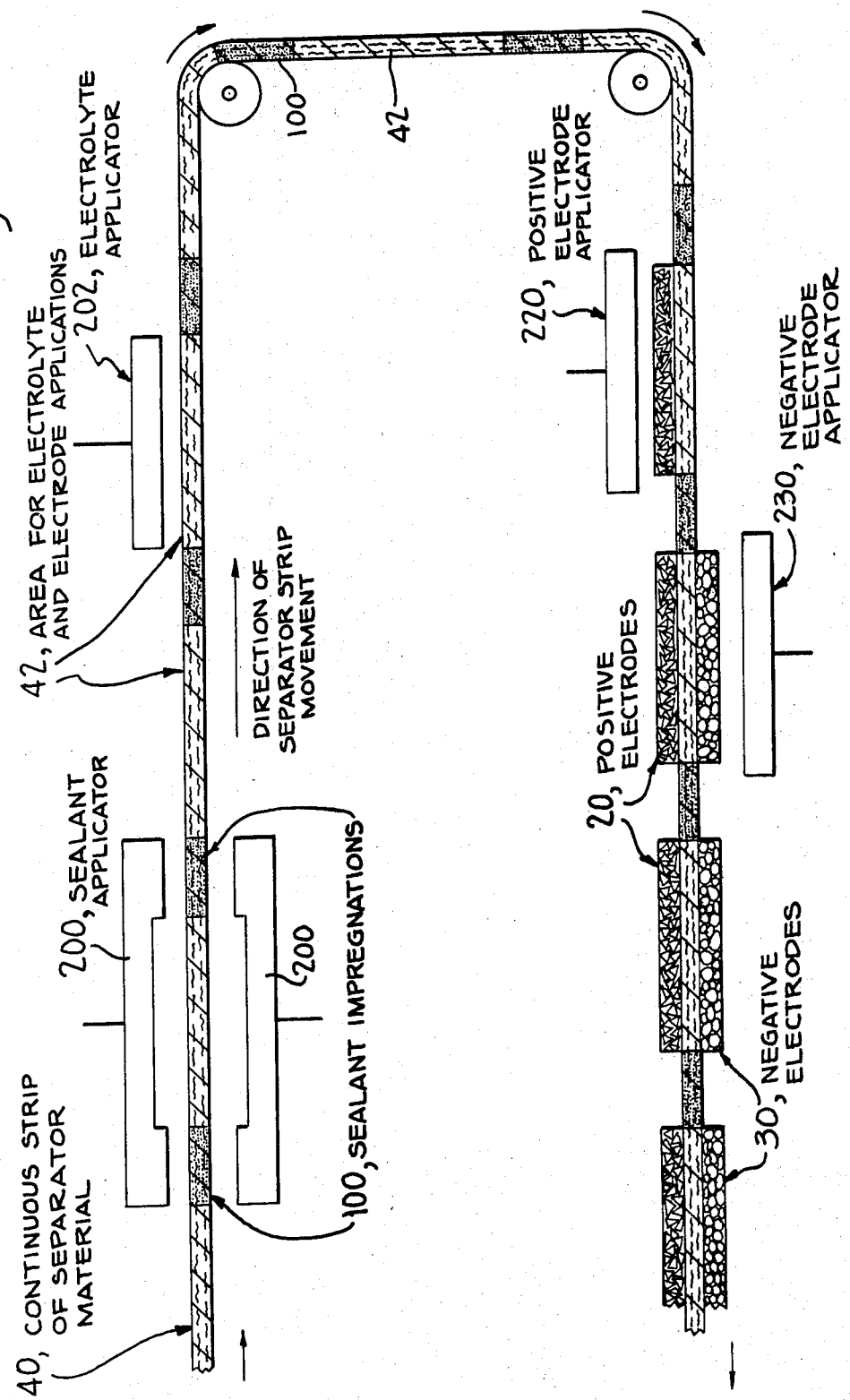
FIG. 1 is a schematic diagram showing deposits of positive and negative electrodes being placed on the opposite sides of a continuous strip of separator material.

FIG. 1 is a schematic diagram showing a continuous strip of separator material 40 being passed by positive and negative electrode applicators 220 and 230, respectively, where the applicators place intermittent deposits of positive and negative electrodes 20 and 30, respectively, on opposite sides of the carrier strip from each other. The separator 40 may be made from a wide variety of materials including the synthetic fibers and cellulosic materials which are conventional in battery construction as well as from woven or non-woven fibrous materials such as polyester, nylon, polypropylene, polyethylene and glass. Each deposit of negative electrode 30 is substantially opposite a deposit of positive electrode 20. The applicators 220 and 230 may be spaced apart as shown in FIG. 1 so that one applicator first makes its deposit and later the other applicator makes the opposing deposit, or they may be spaced opposite one another so that they make their opposing deposits simultaneously. The applicators 220 and 230 shown in FIG. 1 are intended to represent electrode applicators in general and are not intended to illustrate only one or more specific types of applicators.

Figure 2:
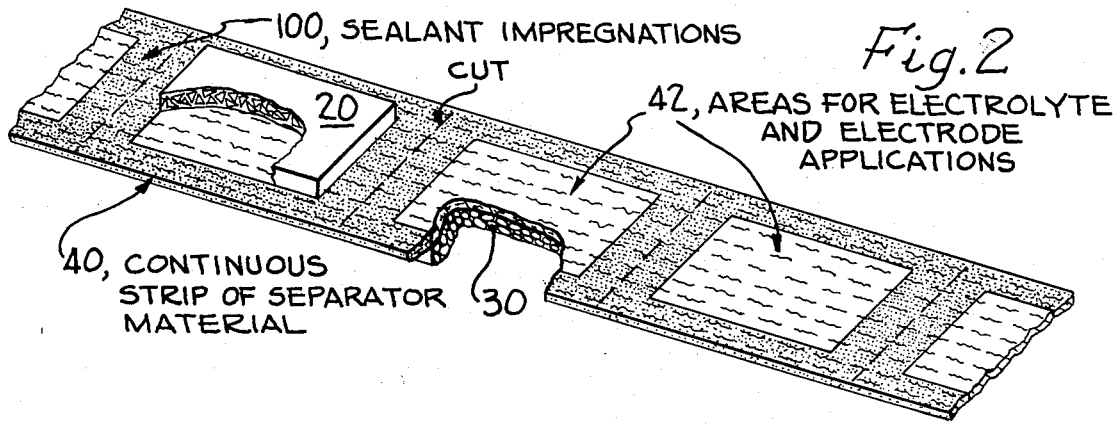
FIG. 2 shows a portion of the continuous separator strip after the electrodes are applied thereon.

FIG. 1 also shows two steps preceeding the placement of electrodes onto the continuous strip of separator material. The first is the impregnation of patches of adhesive sealant 100 along the strip of separator material, each such impregnation resulting in a nonimpregnated area 42 inside the adhesive patch as shown in FIG. 2. The second step is the application of electrolyte onto each area 42. The first step, the impregnation of adhesive sealant patches 100, is not essential for purposes of this invention but is nevertheless desirable as a means for providing a liquid impervious seal around each cell in subsequently assembled batteries. The application of electrolyte onto the separator does not necessarily need to precede application of the electrodes onto the carrier strip; this invention is not to be construed as being limited to a sequence in which electrolyte is applied onto the separator strip before the electrodes are applied, that sequence being shown in FIG. 1 for purposes of illustration only.

If desired, a deposit of gel-like material may be applied to one or both sides of the separator before the electrodes are deposited thereon to assist.

If desired, a deposit of gel-like material may be applied to one or both the electrodes in adhering or bonding to the strip of separator material 42 as well as to decrease the electrical resistance across the interface between each electrode and the separator. These gels may be simply viscous deposits of the electrolyte or they may include a wide variety of other materials such as polyvinyl alcohol, methyl cellulose, and the many formulas of starches commonly known in the battery industry. The gels may be dried to form films or they may remain as gels. The gels may or may not contain water soluble salts. It is to be understood that this invention contemplates the application of electrodes onto a continuous strip of separator material which has been coated or impregnated into or onto one or both sides with such gels.

As can be seen from FIG. 1, the application of the electrodes 20 and 30 along the continuous strip of separator material 40 results in a series of segments of separator material each of which has a positive and negative electrode on the opposite sides thereof. Immediately after passing the two electrode applicators these segments are structurally connected to each other as parts of the continuous separator strip. Each of these segments is subsequently assembled into a battery. If assembled into batteries while still part of the continuous carrier strip, these segments may simply be left structurally connected so as to form a tape of structurally connected batteries, or an additional and subsequent step may then be taken, that of cutting the segments and the batteries of which they are components into structurally unconnected members, retaining to the last the advantages of being able to process a continuous strip rather than a series of individual pieces. The batteries which are structurally connected together by the continuous carrier strip may be electrically unconnected to each other, or they may be electrically connected in series or parallel, depending upon other aspects of the battery construction not germane to this invention. See FIG. 2 for dashed lines indicating where such cutting might occur. Cutting of the separator strip into structurally unconnected segments may occur before those segments are assembled into batteries, however, retaining through at least a part of the battery production the advantages of being able to use the separator as a carrier or processing implement for the electrodes of both polarities. These structurally unconnected segments may, if desired, be assembled into batteries by being placed on continuous strips of other materials required in the battery.

Figure 3:
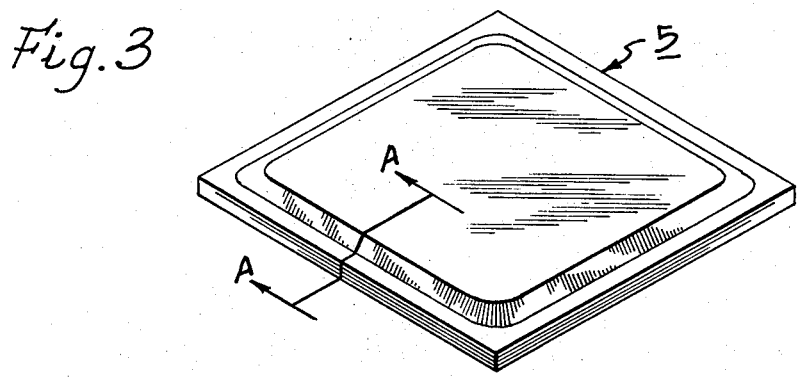
FIG. 3 is an oblique view of a multicell battery constructed by the use of the continuous strip of separator material.
Figure 4:
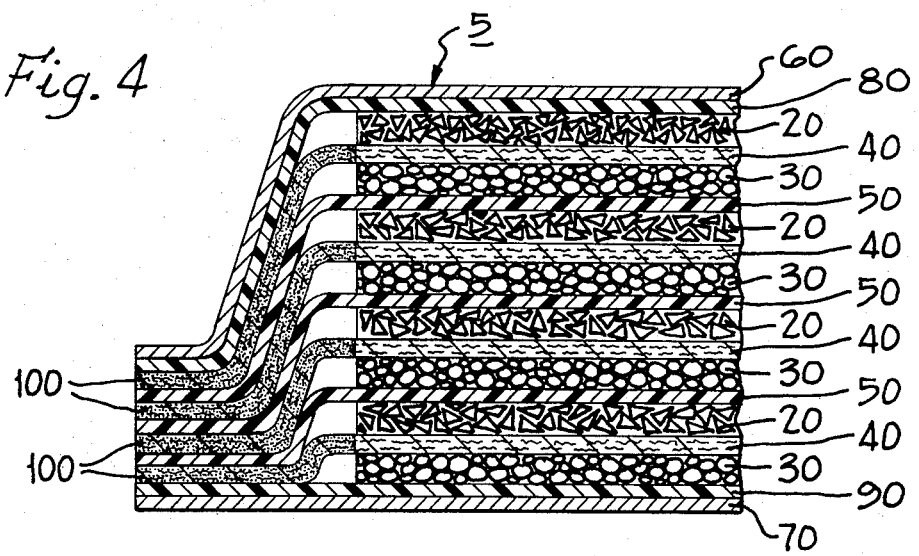
FIG. 4 illustrates a cross-section of the battery shown in FIG. 3 taken along the line A—A of FIG. 3. The thickness of the battery is shown greatly magnified for purposes of illustration.

FIGS. 3 and 4 illustrate a multicell battery 5 assembled with four continuous carrier strips of the type which were processed as shown in FIGS. 1 and 2. Although shown in the drawing as being structurally unconnected to any other battery, the multicell battery 5 may be considered as being one of many batteries structurally connected together by the continuous strips of separator material, or it may be considered as being structurally unconnected to other batteries as a result of cutting the separator strips into unconnected segments. Referring to FIG. 4, during the assembly of the multicell battery 5 intercell connectors 50 are placed between the continuous carrier strips. Later in the assembly a liquid impervious layer is placed around the electrodes, separators and intercell connectors. The impervious layer shown in FIG. 4 comprises two pieces 80 and 90, both of which are electrically conductive plastic; other impervious layers having other compositions may be used, and the composition or construction of such layers is not a limitation on this invention. Also shown in FIG. 4 are outer metal foils or sheets 60 and 70 which function both as vapor barriers to prevent evaporation of electrolyte from the battery and as current collecting means; these foils, which are optional and are not required by this invention, may be laminated to the liquid impervious layers 80 and 90 if desired. As a final step in the assembly of the battery, the liquid impervious layer is sealed around the electrodes, separators, and intercell connectors. This sealing may conveniently be done by using the adhesive impregnations 100 shown in FIGS. 1, 2 and 4 as being present in the continuous strip of separator material, but alternative sealing constructions such as the use of adhesive patches deposited on the intercell connectors and impervious layer may also be used.

Subsequent to the assembly of the multicell batteries as described above, the batteries may be structurally unconnected from each other if desired by the additional step of cutting the separator strips (and any other members of the batteries assembled into the batteries while in the form of continuous strips) between pairs of opposed positive and negative electrodes. Cuts may be made between each successive pair of opposed electrodes or between longer portions each of which connects several multicell batteries. In either case, the cutting may be described generally as occurring between pairs of opposed positive and negative electrodes to obtain structurally unconnected batteries.

The composition of each of several of the members in the battery may take alternative forms, and the compositions of those members will now be discussed.

The positive electrodes 20 may each comprise particles of electrochemically positive active material contained in and dispersed throughout a binder matrix. The positive active material conventionally is divided into tiny particles so as to increase the ratio of total surface area to weight in the active material and thereby increase the rate at which the electrochemical reactions can occur by increasing the surface areas where they occur. The binder maintains the internal electronic conductivity and the structural integrity within the positive electrodes. Since electrolyte must have access to the surface of each active material particle, the binder matrix must be made sufficiently porous so that the electrolyte may diffuse throughout the electrode rapidly and thoroughly. Preferably the pores in the electrode are produced by the evaporation of liquid during the construction of the electrode;

the evaporating liquid may be part of a dispersion binder system in which the solid binder contained in the finally constructed electrode comprises tiny particles of binder material dispersed throughout and not dissolved in the liquid while the electrode is being constructed, or the evaporating liquid may be part of a solution binder system in which the solid binder contained in the finally constructed electrode is dissolved in the liquid which is later evaporated. The porosity of the positive electrodes may be increased as the discharge rate desired in the battery is increased. Electrodes may also be constructed using combinations of the dispersion and solution systems. Alternatively, the pores might be produced by the dissolving of a solid which was present during construction of the electrode or by passing gases through or generating gases within the electrode at controlled rates during electrode construction. The positive electrodes 20 may, and preferably will, also contain amounts of a good electrical conductor such as carbon or graphite to improve the electrical conductivity between the active material particles, the positive active material particles themselves generally being relatively poor conductors of electricity. The conductivity of the active material particles together with the conductivity of the binder itself will influence the amounts of conductors added to the electrode. The electrodes 20 may also contain if desired small amounts of additional ingredients used for such purposes as maintaining uniform dispersion of active material particles during electrode construction, aiding the diffusion of electrolyte through the pores of the finally constructed electrodes, controlling viscosity during processing, controlling surface tension, controlling pot life, or for other reasons. When the positive electrodes 20 are applied to the separator they may be of liquid or slurry consistencies capable of being applied by painting, brushing, or printing techniques, and the electrode deposits may be as thin as one or a few thousandths of an inch.

The negative electrodes 30 may comprise metallized spray or vacuum deposition or may comprise tiny particles of metals contained in and dispersed throughout a binder matrix. Such metallized sprays or vacuum depositions and such binder mix formulations may all be considered as alternative constructions in which the negative electrodes comprise a plurality of individual, discrete particles of electrochemically active material. If the negative electrodes utilize a binder matrix, in general the same considerations regarding that matrix apply to the negative electrodes as do for the positive electrodes except that no electrical conductor may be needed to achieve desired electrical conductivity between the active material particles since the negative active materials are generally better conductors than are the positive materials. When the negative electrodes utilize a binder matrix, the binder system need not be the same as the one used in the positive electrodes, and even if it is the proportions of binder, active material particles, and other ingredients in the negative electrodes may have a different optimum than the proportions of analogous ingredients in the positive electrode. The initial porosity of the negative electrodes may sometimes be less than that of the positive electrodes; since the electrode discharge reaction products are sometimes dissolved in the battery electrolyte, the porosity of those electrodes will sometimes increase as the battery is discharged. The porosity of the negative electrodes may be increased as the discharge rate desired in the battery is increased.

It is apparent that electrodes which comprise particles of active material would be unable or poorly suited to be produced as continuous strips. They should therefore be deposited upon a substrate which, in the case of this invention, is the continuous separator carrier strip.

If segments of the separator having positive and negative electrodes deposited on the opposite sides thereof are assembled into multicell batteries such as the one shown in FIG. 4, then an impervious intercell connector 50 must be placed between each consecutive pair of cells. These intercell connectors 50 may take several different embodiments, but regardless of the specific embodiment the impervious intercell connector 50 must meet three essential requirements: it must be impervious to the electrolyte of the battery so that one cell may be sealed off from the next; it must provide some means by which electrical current may be conducted between the positive electrode in one cell and the negative electrode in the next cell; and it must not create any undesired reactions with the electrodes or other components of the battery.

The particular embodiment of the impervious intercell connector shown in FIG. 4 may be a sheet or film of electrically conductive plastic. Alternative embodiments of the impervious intercell connector may be achieved with metal foils, conductive adhesives, or combinations of them, since with the use of metal foils it may be necessary or desirable to interpose a layer of conductive adhesive or other conductive polymer between the foil and the positive electrode 20 to prevent the foil from engaging in an undesired electrochemical reaction with the positive electrode or the electrolyte. The impervious intercell connector 50 may also be a combination of an electrically nonconductive member such as plastic, with one or more members of electrically conductive material extending around the edge of or through the nonconductive member to conduct electrical current between the positive electrode in one cell and the negative electrode in the next consecutive cell.

Another essential of the multicell battery 5 is a liquid impervious layer comprising members 80 and 90 sealed around the electrodes and electrolyte impregnated separators as shown in FIG. 4. When a battery is in storage waiting to be placed into service there is an opportunity for liquids from the electrolyte to escape from the battery, leaving the battery incapable of performing as desired when later placed into use. Also during discharge the battery may produce liquid byproducts which are corrosive, poisonous, or otherwise harmful, and it is desirable to prevent these liquids from escaping from the battery. The liquid impervious layer provides means for preventing or minimizing the loss of these liquids.

The multicell battery 5 must also be provided with means for conducting electrical current between the positive electrode 20 in one cell and the exterior of the liquid impervious layer and additional means for conducting electrical current between the negative electrode 30 in the other end cell and the exterior of the liquid impervious layer. This additional requirement of the battery may be met by the liquid impervious layer members 80 and 90 themselves by constructing those members from a conductive material such as an electrochemically inert, electrically conductive plastic, and such a construction is shown in FIG. 4. As an alternative to the conductive plastic, metals which are either themselves electrochemically nonreactive or are made so by appropriate conductive, nonreactive coatings may be used for the liquid impervious layer. Another alternative construction not illustrated in the drawings is to use a liquid impervious layer which is made from an electrically nonconductive material and then extend separate conductive means from the edge of the nonconductive, liquid impervious layer so that current may be withdrawn from the battery. Conductive materials such as coatings, adhesives, or inert metal depositions may also be used to collect current, and such materials may be applied directly onto the positive electrodes prior to cutting the continuous separator strip. It is to be understood that all of these alternative constructions are encompassed by the general statement that a liquid impervious layer is sealed around the electrodes and electrolyte impregnated separators, that electrically conductive means are connected to the end positive electrode which extend to the exterior of the liquid impervious layer, and that additional electrically conductive means are connected to the end negative electrode which extend to the exterior of the liquid impervious layer.

Two additional components, members 60 and 70, are shown in FIG. 4 and are illustrated because they may be used in the construction of the multicell battery produced by this invention. It should be understood, however, that the present invention does not require the use of members 60 and 70. Those members are metal foils or sheets, e.g., steel foil, which function both as vapor barriers to prevent evaporation of electrolyte from the battery and as current collecting means. Where a nonmetallic, nonconductive vapor barrier is used instead of steel foil, additional means must be provided to conduct current from the exterior of the liquid impervious layer (members 80 and 90) to the exterior of the vapor barrier. Where vapor barriers such as the members 60 and 70 shown in FIG. 4 are used with the battery, they may be laminated to the liquid impervious layers 80 and 90 if desired.

Liquid impervious sealing means must be provided around the perimeter of each cell to prevent electrolyte loss from the battery and to prevent the electrolyte of one cell from migrating to another cell around the perimeter of an intercell connector. Adhesive impregnations 100 may serve as the needed liquid impervious sealing means. By being made from an electrically nonconductive adhesive, impregnations 100 also serve an additional purpose, that of preventing undesired electrical connections between electrically conductive members of the battery. Other means for providing the seals may also be used.

While it is preferred to employ the LeClanche electrochemical system (comprising manganese dioxide positive active material, zinc negative active material, and an electrolyte comprising ammonium chloride and/or zinc chloride), the battery made using this invention may employ a wide variety of positive and negative electrode materials and a wide variety of electrochemical systems including both primary and secondary systems. Among the positive electrode materials are such commonly used inorganic metal oxides as manganese dioxide, lead dioxide, nickel oxyhydroxide, mercuric oxide and silver oxide, inorganic metal halides such as silver chloride and lead chloride, and organic materials capable of being reduced such as dinitrobenzene and azodicarbonamide compounds. Among the negative electrode materials are such commonly used metals as zinc, aluminum, magnesium, lead, cadmium and iron. This invention may employ the electrolytes commonly used in the LeClanche system (ammonium chloride and/or zinc chloride), various alkaline electrolytes such as hydroxides of potassium, sodium, and/or lithium, acidic electrolytes such as sulfuric or phosphoric acid, and nonaqueous electrolytes, the electrolytes of course being chosen to be compatible with the positive and negative electrodes.

Among the wide variety of electrochemical systems which may be used in the multicell battery 5 are those in which the positive electrodes comprise manganese dioxide, the negative electrodes comprise metals such as zinc, aluminum, or magnesium and the electrolyte substantially comprises an acidic solution of inorganic salts. Another commonly known systems useful in the battery 5 is the alkaline manganese system in which the positive electrodes comprise manganese dioxide, the negative electrodes comprise zinc, and the electrolyte substantially comprises a solution of potassium hydroxide. Other aqueous electrolyte systems including those of nickel-zinc, silver-zinc, mercury-zinc, mercury-cadmium, and nickel-cadmium may also be used. Systems employing organic positive electrodes and acidic electrolytes may also be used, including rechargeable systems using azodicarbonamide compound electrodes and LeChannche electrolyte.

The invention may be used with embodiments other than those described above. For example, the positive and negative electrode deposits can be made continuously rather than intermittently along the separator strip if desired. Using that construction a multicell battery of substantial length, e.g. a tape, could be built by processes which retain the high speed, low cost advantages of being able to process strips throughout the entire assembly of the battery. The multicell tape batteries could subsequently cut into smaller segments of any preferred length if desired. Finally, the electrolyte may be either omitted during assembly or included in a manner which prevents it from contacting the electrodes until some subsequent activation step is performed, thereby producing a reserve-type rather than a primary multicell battery.

I claim:
1. The method of constructing multicell batteries comprising the steps of:
   (a) placing at least two positive electrodes along a first continuous carrier strip of separator material;
   (b) placing at least two negative electrodes along the first carrier strip, each negative electrode being on the other side of the first strip from and substantially opposite a positive electrode;
   (c) placing at least two positive electrodes along a second continuous carrier strip of separator material;
   (d) placing at least two negative electrodes along the second carrier strip, each negative electrode being on the other side of the second strip from and substantially opposite a positive electrode;
   (e) assembling multicell batteries which are structurally connected together by the continuous carrier strips having positive and negative electrodes deposited thereon, the method of assembling the multicell batteries comprising the steps of
      (i) placing intercell connectors between the positive electrodes on one of the continuous separator strips and the negative electrodes on the other continuous separator strip; and,
      (ii) sealing liquid impervious layers around the electrodes so that each electrode is surrounded by a liquid impervious seal.

2. The method of claim 1 together with the additional subsequent step of cutting the separator strips to obtain structurally unconnected multicell batteries.

3. The method of claim 1 in which both the positive and negative electrodes when placed along the separator strip are in liquid, slurry cosistencies and in which the electrochemically active materials in those electrodes comprise a plurality of individual, discrete particles.

4. The method of claim 1 in which the positive electrodes when placed along the separator strips are in a liquid, slurry consistency, and in which the electrochemically active mateerials in both the positive and negative electrodes comprise a plurality of individual, discrete particles.

5. The method of claim 3 in which the electrochemically active material particles in the positive and negative electrodes comprise manganese dioxide and zinc, respectively.

6. The method of claim 4 in which the electrochemically active material particles in the positive and negative electrodes comprise manganese dioxide and zinc, respectively.

References Cited
UNITED STATES PATENTS

| 2,844,641 | 7/1958 | Lang et al. | 136—175 |
| 2,715,652 | 8/1955 | Chubb et al. | 136—111 |
| 2,762,858 | 9/1956 | Wood | 136—111 |
| 3,353,999 | 11/1967 | Osborn | 136—83 R |

DONALD L. WALTON, Primary Examiner

U.S. Cl. X.R.

136—108, 111